United States Patent [19]
LaPointe et al.

[11] Patent Number: 5,171,000
[45] Date of Patent: Dec. 15, 1992

[54] ADJUSTABLE ROCKER SPRING APPARATUS

[75] Inventors: Larry P. LaPointe, Temperance; Karl J. Komorowski, Jr., Petersburg; Judy E. Fay, Newport, all of Mich.

[73] Assignee: La-Z-Boy Chair Company, Monroe, Mich.

[21] Appl. No.: 666,348

[22] Filed: Mar. 8, 1991

[51] Int. Cl.$^5$ ............................ F16F 1/06; A47C 3/02
[52] U.S. Cl. .................................. 267/166; 267/131; 267/177; 267/178; 297/261; 297/265; 297/263
[58] Field of Search ............... 267/166, 170, 171, 177, 267/178, 179, 150, 289, 131, 132, 133; 297/261, 265, 266, 267, 268, 263; 248/582, 624, 576, 605, 596

[56] References Cited

U.S. PATENT DOCUMENTS

| | | | |
|---|---|---|---|
| 448,240 | 3/1891 | Kade | 297/266 X |
| 2,528,331 | 10/1950 | Bell | 248/576 X |
| 2,772,723 | 12/1956 | Tunnell | 297/267 |
| 2,813,574 | 11/1957 | Hawkins . | |
| 2,871,916 | 2/1959 | Fox | 297/263 X |
| 3,053,570 | 9/1962 | Fox | 297/263 |
| 3,190,693 | 6/1965 | Underdown | 297/263 |
| 3,300,244 | 1/1967 | Hughes . | |
| 3,415,531 | 12/1968 | Kiel . | |
| 3,547,393 | 12/1970 | Gordih | 297/263 X |
| 3,840,205 | 10/1974 | Faull | 297/263 X |
| 3,881,713 | 5/1975 | Joyce | 297/263 X |
| 3,966,251 | 6/1976 | Belisle . | |
| 4,810,032 | 3/1989 | Gibson . | |

Primary Examiner—Douglas C. Butler
Attorney, Agent, or Firm—Harness, Dickey & Pierce

[57] ABSTRACT

An adjustable rocker spring apparatus for adjustably positioning a rocker block of a rocking chair relative to a stationary base of the chair. The apparatus generally comprises an L-shaped upper bracket and an L-shaped lower bracket each having forward, central and rearward portions. Each such forward, central and rearward portion include a plurality of apertures therein. A pair of independent coil springs are disposed between portions of the upper and lower brackets and secured thereto by tabs. The independent coil springs are alignably maintained and positioned by slot openings in lip portions of each of the L-shaped upper and lower brackets. The plurality of independent apertures in each of the forward, central and rearward portions of the upper and lower brackets enable the apparatus to be adjustably secured with conventional fasteners to a rocker block and stationary base of a rocking chair. Precise adjustment and proper balance of the rocking chair can thereby be obtained when using rocker blocks and/or stationary bases of differing configurations, or when using uniform rocker blocks and stationary bases of chairs having differing padding, upholstery, or option features, without a need for modifying the apparatus or the rocker block or stationary base of the rocking chair.

11 Claims, 3 Drawing Sheets

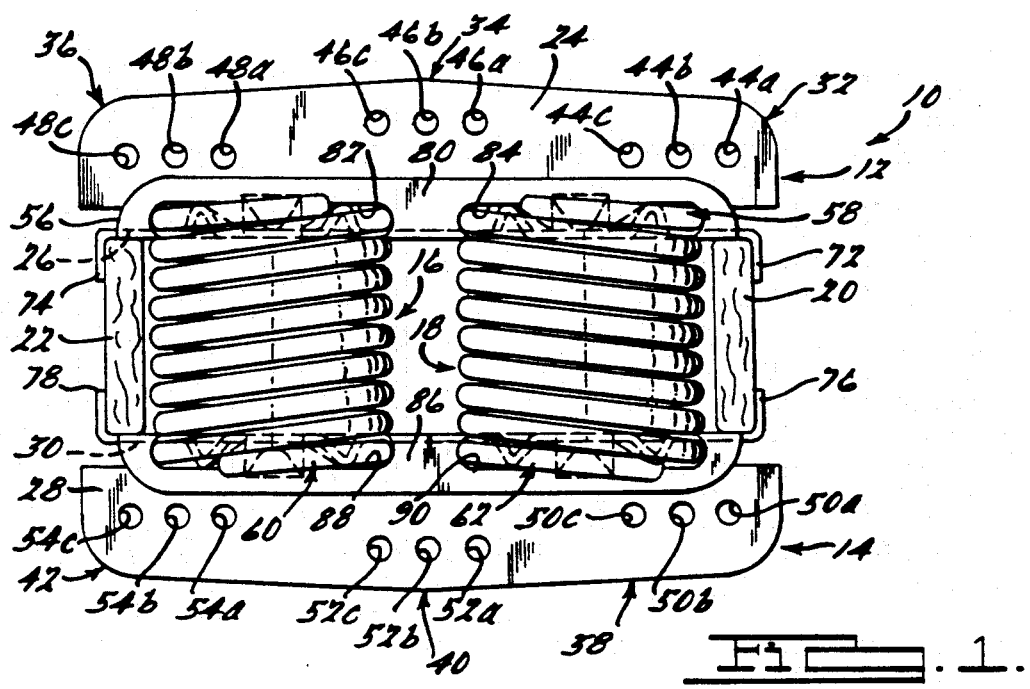
FIG. 1.
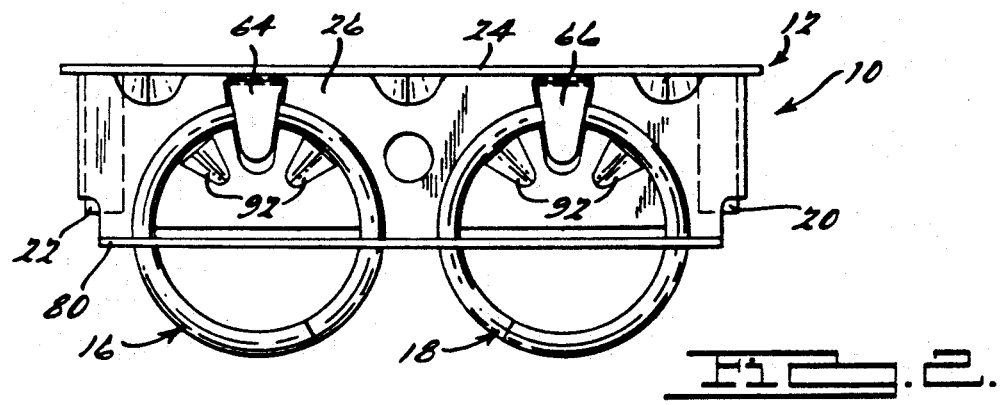
FIG. 2.
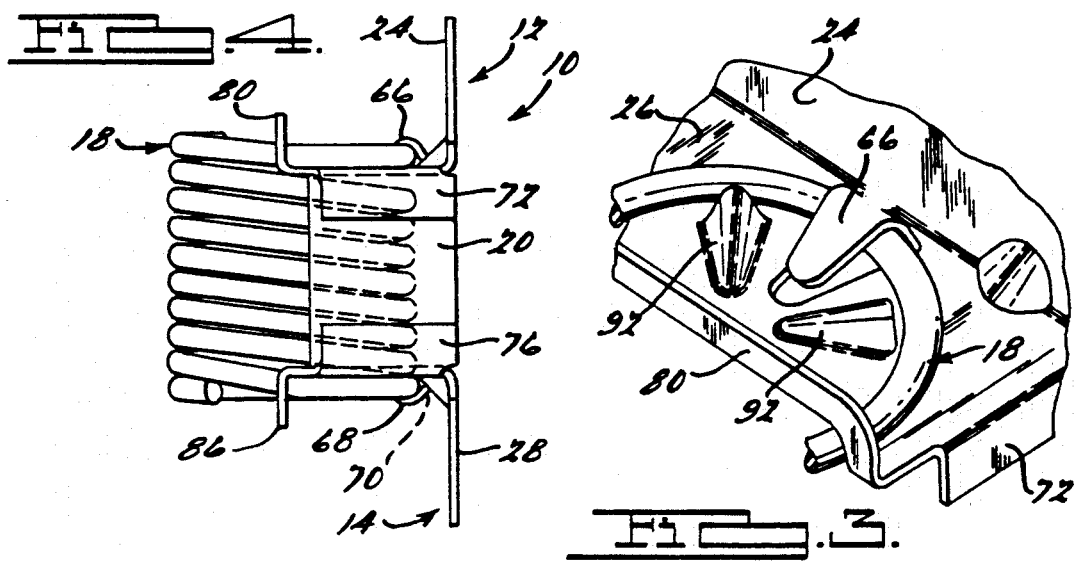
FIG. 4.
FIG. 3.

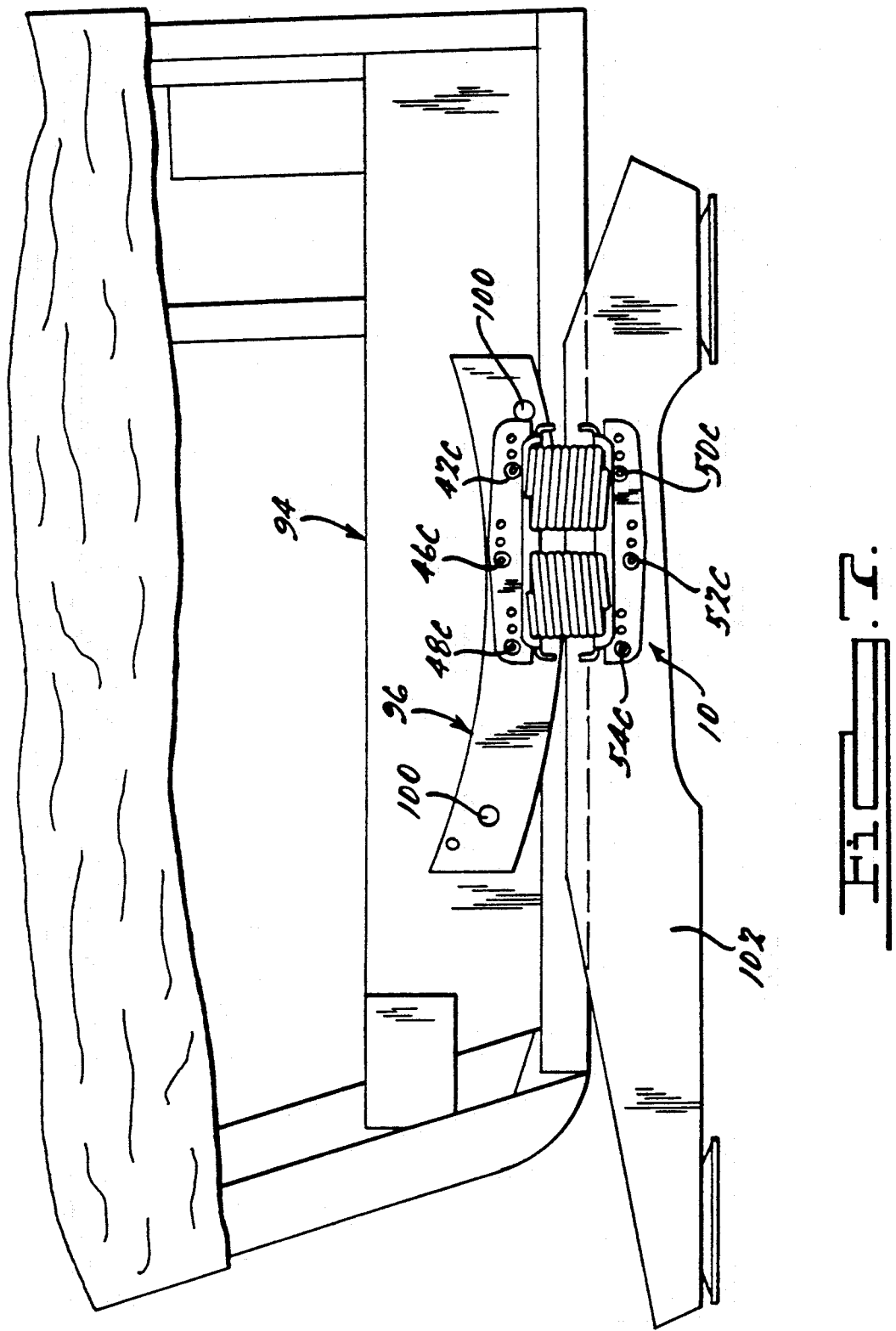

ADJUSTABLE ROCKER SPRING APPARATUS

BACKGROUND OF THE INVENTION

1. Technical Field

This invention relates generally to rocking chairs and, more particularly, to an adjustable rocker spring apparatus for coupling a rocker block and a stationary base of a rocking chair together and enabling a proper balance to be achieved for the rocking chair.

2. Discussion

Rocking chairs typically include some form of spring mechanism between their base portions and lower structure of the chair itself to enable the chair to rock freely in forward and rearward movements. Problems arise, however, when installing such spring mechanisms and attempting to position them to obtain a proper "balance" for the chair when the chair is at rest and also when the chair is rocked forwardly and rearwardly.

Typically, such rocking chairs include a wooden mounting structure underneath the rocking chair itself. The wooden mounting structure includes a plurality of holes drilled therein to which the spring mechanism is securely fastened with conventional fasteners. The positioning of the drilled holes in the wooden mounting structure is critical to obtaining a proper balance for the chair when the chair is at rest and also when the chair is rocked forwardly and rearwardly. If the drilled holes are not positioned at precisely the right points, the chair may tend to tip forwardly or rearwardly while an occupant is seated in the chair. Improper positioning of the drilled holes may also cause the chair to assume awkward forwardly or rearwardly tilting attitudes as the occupant sits upright in the chair. In addition, different chair styles with different weight distributions on a standard set of rocker blocks cannot be readily adjusted to compensate for different centers of gravity.

Heretofore, the attempts to alleviate the requirement for precise positioning and adjustability of the drilled holes has consisted primarily of drilling additional, closely spaced holes in the wooden mounting structure. However, to obtain a proper balance for the rocking chair the additional drilled holes often have to be spaced extremely close together because a small variation in the placement of such spring mechanisms will result in precise balancing of the chair. When holes are drilled in the wooden mounting structure closely adjacent each other, however, such drilling substantially and, often unacceptably, weakens the wooden mounting structure.

Accordingly, it would be desirable to have an adjustable rocker spring mechanism which could be adjustably, fixedly secured to a wooden mounting structure of a rocking chair in a variety of positions to enable the proper balance to be obtained for the rocking chair. Such an adjustable rocker spring mechanism would reduce the criticality of the positioning of the holes when the holes are drilled in the wooden mounting structure and maintain the structural strength of the wooden mounting structure by avoiding the drilling of closely adjacent holes therein.

It is therefore a principal object of the present invention to provide an adjustable rocker spring apparatus operable to be adjustably, fixedly secured between a wooden mounting structure and a stationary base of a rocking chair to thereby enable a proper balance for the rocking chair to be obtained.

It is a further object of the present invention to provide an adjustable rocker spring apparatus which may be adjustably, fixedly secured to a wooden mounting structure of a rocking chair without the need for drilling closely adjacent holes in the wooden mounting structure.

It is still a further object of the present invention to provide an adjustable rocker spring apparatus which may be quickly and easily secured to a wooden mounting structure of a rocking chair without the need for special tools or other special equipment.

It is another object of the present invention to provide an adjustable rocker spring apparatus which may be used with wooden mounting structures of slightly varying configuration or weight distribution and be alignably secured thereto to obtain a proper balance for the rocking chair.

SUMMARY OF THE INVENTION

An adjustable rocker spring apparatus is disclosed for a rocking chair. The apparatus generally comprises an upper bracket and a lower bracket. A plurality of independent springs are disposed inbetween the upper and lower brackets and secured to portions thereof.

Each of the upper and lower brackets includes longitudinally forward, central and rearward portions. Each of the forward, central and rearward portions further includes a plurality of independent apertures therein. The pluralities of apertures enable the apparatus to be adjustably secured to a mounting structure and a stationary base of a rocking chair.

The invention enables precise balance of a rocking chair to be obtained without the need for drilling a plurality of closely adjacent mounting holes in the mounting block, which is usually constructed of wood. Avoiding the drilling of closely adjacent holes in the wooden mounting or rocker blocks serves to preserve the structural strength of the mounting block while allowing very precise balancing of the rocking chair to be obtained.

BRIEF DESCRIPTION OF THE DRAWINGS

The various advantages of the present invention will become apparent to one skilled in the art by reading the following specification and subjoined claims and by referencing the following drawings in which:

FIG. 1 is a side elevational view of an adjustable rocker spring apparatus in accordance with the present invention;

FIG. 2 is an elevational plan view of the apparatus;

FIG. 3 is an elevational perspective view of a portion of the apparatus;

FIG. 4 is an elevational end view of the apparatus;

FIG. 7 is an elevational side view of a rocking chair incorporating the apparatus of the present invention, and illustrating the apparatus alignably secured to the rocker block and stationary base portions of the rocking chair.

DETAILED DESCRIPTION OF THE PREFERRED EMBODIMENTS

Figure 5:
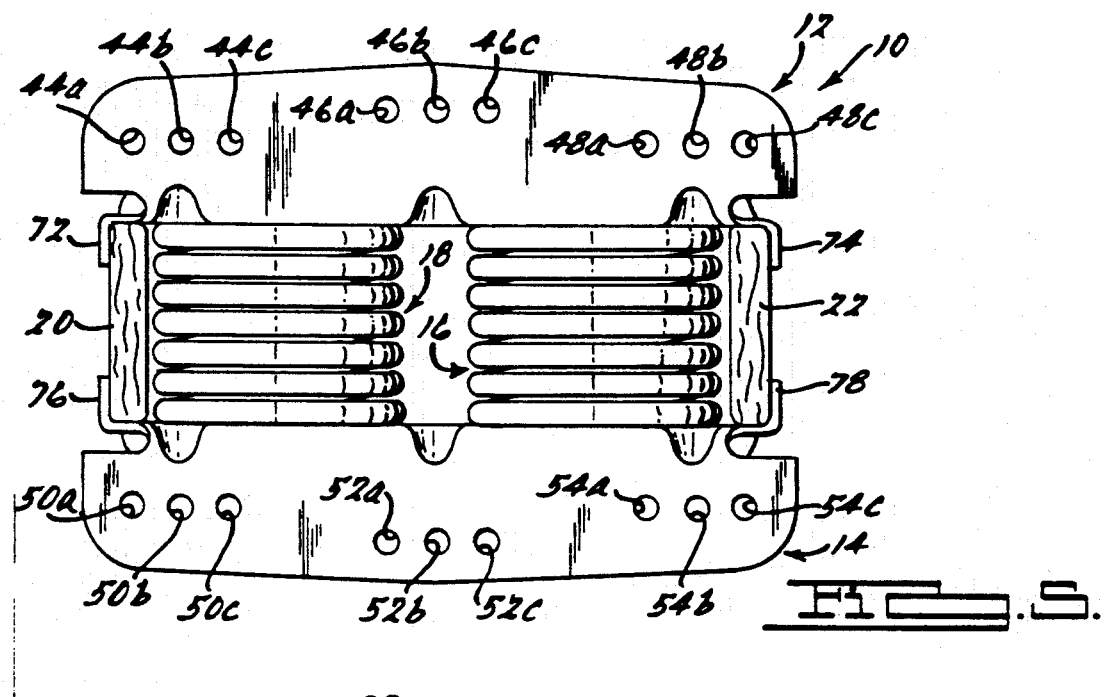
FIG. 5 is an elevational rear view of the apparatus.

Referring to FIGS. 1-5, an adjustable rocker spring apparatus 10 in accordance with a preferred embodiment of the present invention is shown. The apparatus 10 generally comprises an L-shaped upper bracket 12, an L-shaped lower bracket 14 and a plurality of independent coil springs 16 and 18 disposed therebetween. A pair of optional, independent installation shims 20 and 22 are also illustrated and will be discussed in more detail in the following paragraphs in connection with the operation of the apparatus 10.

The L-shaped upper bracket 12 includes first and second bracket portions 24 and 26 respectively. The L-shaped lower bracket 14 similarly includes first and second bracket portions 28 and 30 respectively. The brackets 12 and 14 are preferably constructed of rigid materials such as metal. It should be appreciated, however, that a wide variety of materials having relatively high rigidity and durability may be used if required by specific applications.

The first bracket portion 24 of L-shaped upper bracket 12 includes a longitudinally forward portion 32, a central portion 34 and a longitudinally rearward portion 36. The first bracket portion 28 of the L-shaped lower bracket 14 similarly includes longitudinally forward, central and rearward portions 38, 40 and 42, respectively.

The forward 32, central 34 and rearward 36 portions each include therein a plurality of independent apertures 44a,44b,44c, 46a,46b,46c and 48a,48b,48c, respectively. Similarly, the forward 38, central 40 and rearward 42 portions of first bracket portion 28 each include therein a plurality of independent apertures 50a,50b,50c,52a,52b,52c and 54a,54b,54c, respectively.

The independent coil springs 16 and 18 each have upper end portions 56 and 58, and lower end portions 60 and 62, respectively.

The second bracket portion 26 of L-shaped upper bracket 12 includes independent tabs 64 and 66. The second bracket portion 30 of L-shaped lower bracket 14 includes a similar plurality of tabs 68 and 70, with tab 70 being positioned directly behind and hidden from view by tab 68 in FIG. 4.

Further included in the second bracket portion 26 of L-shaped upper bracket 12 is a transversely extending forward shoulder portion 72 and a transversely extending rearward shoulder portion 74. The second bracket portion 30 of L-shaped lower bracket 14 similarly includes a transversely extending forward shoulder portion 76 and a transversely extending rearward shoulder portion 78. Shoulder portions 72 and 76 operate to form a partial channel with the spring 18 within which independent installation shim 20 may be slidably inserted and removed. Similarly, shoulder portions 74 and 78 form a partial channel with the spring 16 in which independent installation shim 22 may be slidably inserted and removed.

Second bracket portion 26 of L-shaped upper bracket 12 also includes a lip portion 80 having independent slot openings 82 and 84 therein. Similarly, the second bracket portion 30 of L-shaped lower bracket 14 includes a lip portion 86 having slot openings 88 and 90 therein. The second bracket portion 26 of L-shaped upper bracket 12 may also include raised alignment tabs 92, as best shown in FIG. 3. Tabs (not shown) similar to tabs 92 are also preferably included in the second bracket portion 30 of L-shaped lower bracket 14. Tabs 92 help maintain independent coil springs 16 and 18 essentially stationary relative to second bracket portions 26 and 30.

Figure 6:
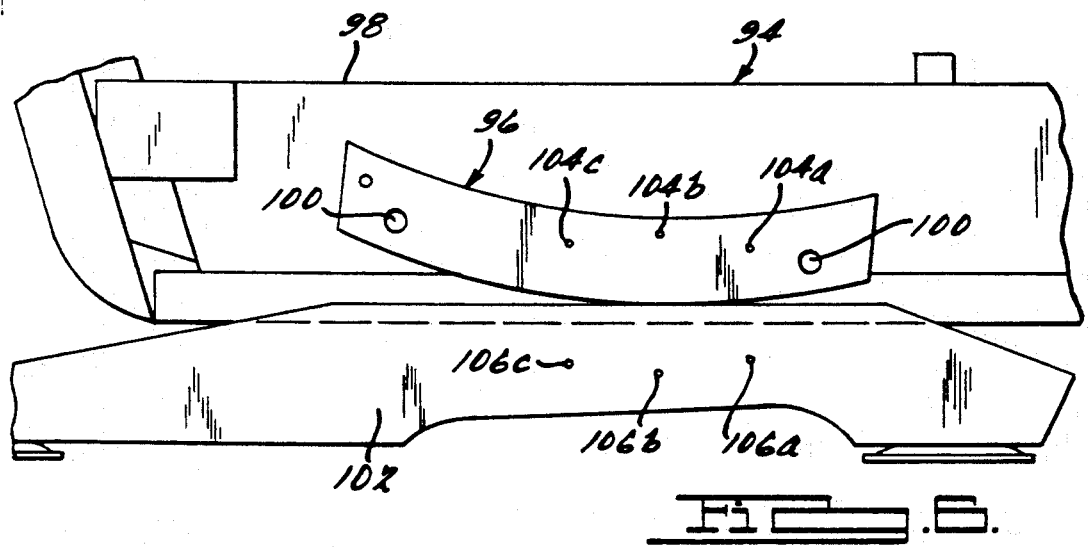
FIG. 6 is a cross-sectional side view of a portion of a rocking chair illustrating more clearly the wooden rocker block and stationary base thereof, and the alignment of the mounting holes therein.

Turning now to FIGS. 6 and 7, a description of the mounting and operation of the apparatus 10 of the present invention will be provided. With initial reference to FIG. 6, there is illustrated a portion of a conventional rocking chair 94 illustrating a wooden rocker block 96 as its mounting structure. The wooden rocker block 96 is secured to a frame portion 98 of the rocking chair 94 via bolts 100 or other suitable fasteners. A stationary wooden base 102 is further included, the function of which will be described momentarily.

The wooden rocker block 96 includes a plurality of holes 104a, 104b and 104c therein. The stationary wooden base similarly includes a preferably like plurality of holes 106a, 106b and 106c therein in substantially vertical alignment with holes 104a-104c. To obtain precise balancing of the rocker, the apparatus 10 is secured to the wooden rocker block 96 and the stationary wooden base 102 via a plurality of screws or other suitable fasteners through one of each plurality of apertures 44, 46, 48, 50, 52 and 54.

As will be immediately apparent, the availability of a plurality of apertures at the forward 32,38 central 34,40 and rearward 36,42 end portions of L-shaped upper and lower brackets 12 and 14 enables the apparatus 10 to be positioned to obtain extremely precise balancing of the rocking chair 94 relative to the stationary wooden base 102.

If additional holes were drilled in wooden rocker block 96 closely adjacent each of holes 104a, 104b and 104c, the structural integrity of the wooden rocker block 96 could be significantly compromised. Furthermore, as the first bracket portions 24 and 28 are placed over the surfaces of wooden rocker block 100 and stationary wooden base 102, the additionally drilled holes would be covered up thus making selection of the precisely desired holes difficult during the installation process. Accordingly, a principal advantage of the apparatus 10 is that providing a plurality of apertures at the forward 32,38, central 34,40 and rearward 36,42 portions of first bracket portions 24 and 28 enables the apparatus 10 to be positioned relative to the wooden rocker block 96 and stationary wooden base 102 to obtain very precise balancing of the rocking chair 94 while maintaining the structural integrity of the rocker block 96 and stationary wooden base 102.

With specific regard to the installation of the apparatus 10, independent installation shims 20 and 22 are preferably first inserted into the partial channels formed by transversely extending forward shoulder portions 72,76 and transversely extending rearward shoulder portions 74,78. The shims 20 and 22 are preferably wedge-shaped, which causes the L-shaped upper and lower brackets 12 and 14 to be forced slightly away from each other as the shims 20 and 22 are inserted. This causes the apertures 44, 46 and 48 of L-shaped upper bracket 12 and the apertures 50, 52 and 54 of L-shaped lower bracket 14 to be spaced apart slightly while the apparatus 10 is secured to the wooden rocker block 96 and the stationary wooden base 102 which are not similarly spaced apart. In this regard it should also be appreciated that holes 104 and 106 shown in FIG. 6 are preferably positioned to account for this slight "spaced-apart" alignment in which the brackets 12 and 14 are maintained during installation.

After the apparatus 10 is secured to the wooden rocker block 96 and stationary wooden base 102 at holes 104 and 106, the shims 20 and 22 may be slidably removed. The tension of coil springs 16 and 18 then causes L-shaped upper and lower brackets 12 and 14, and the wooden rocker block 96 and stationary wooden base 102, to be drawn under tension towards each other. This pretensioning further helps to reduce the play between the wooden rocker block 96 and the stationary wooden base 102 to provide a more firm and positively balanced "feel" to an occupant of the chair 94.

The apparatus 10 is shown assembled to the wooden rocker block 96 and the stationary wooden base 102 in FIG. 7. Although the apparatus 10 is connected via apertures 48c, 46c, 42c, 50c, 52c and 54c, the other aperture sets "a" or "b" of each plurality of apertures 44, 46, 48, 50, 52 and 54 could alternatively be used if slightly adjusted alignment were needed to obtain proper balance of the chair.

An additional advantage of apparatus 10 is that the apparatus 10 may be used to secure a variety of rocker blocks and/or stationary bases having mounting holes therein which vary slightly in relation to the particular center of gravity of the chair which they comprise. Similarly, apparatus 10 may be used to secure chairs having standard rocker blocks and/or stationary bases with uniform mounting holes, but which comprise chairs with differing features such as padding and upholstery, varying leg rest options, and the like which affect the overall center of gravity, and thus the balance point of the chair. Accordingly, the criticality of the positioning of the mounting holes in the rocker block and stationary base is reduced significantly.

Figure 8:
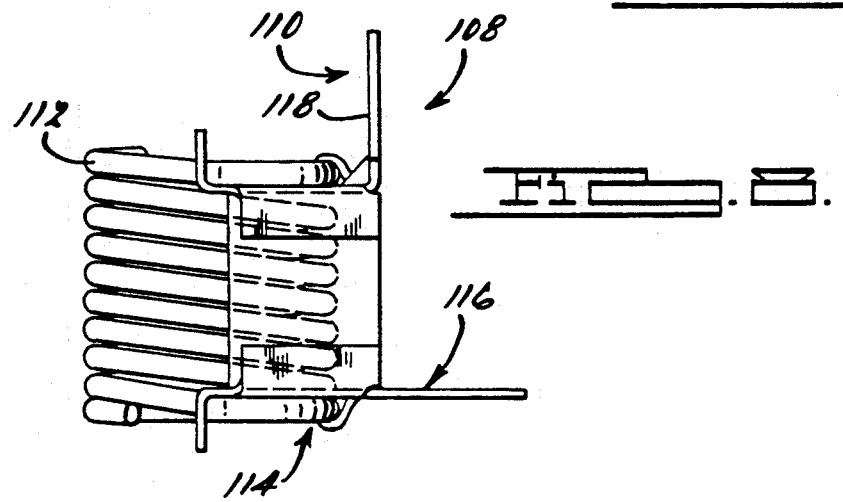
FIG. 8 is an elevational end view of an alternative preferred embodiment of the present invention illustrating a lower bracket of the invention extending transversely of an upper bracket of the invention.

Referring now to FIG. 8, an elevational end view is shown of an alternative preferred embodiment 108 in accordance with the present invention. This embodiment 108 is essentially similar to the embodiment illustrated in FIGS. 1-7 and includes an L-shaped upper bracket 110, a plurality of independent coil springs 112 (of which only one is visible in FIG. 8), and a modified lower bracket 114. The lower bracket 114 is modified to include a laterally extending bracket portion 116 which extends transversely relative to a first bracket portion 118 of the L-shaped upper bracket 110. Bracket portion 116 enables the lower bracket 114 to be secured to a surface of stationary wooden base 102 which is transverse to the mounting surface of the wooden rocker block 96. From FIG. 8, it should be appreciated that a wide variety of modifications may be made to each of the embodiments 10 and 108 of the present invention to suit specific applications as needed.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification and following claims.

What is claimed is:

1. An adjustable rocker spring apparatus comprising:
    a plurality of independent rocker springs;
    an upper bracket having forward, central and rearward portions;
    said forward portion having a first plurality of apertures;
    said central portion having a second plurality of apertures;
    said rearward portion having a third plurality of apertures;
    said upper bracket further including upper securing means for securing thereto said plurality of independent rocker springs;
    a lower bracket having corresponding forward, central and rearward portions, said forward portion of said lower bracket having a first plurality of apertures;
    said central portion of said lower bracket having a second plurality of apertures;
    said rearward portion of said lower bracket having a third plurality of apertures;
    said lower bracket further including lower securing means for securing thereto said plurality of independent rocker springs; and
    said plurality of independent rocker springs being disposed inbetween said upper and lower brackets, each one of said independent rocker springs having an upper end portion and a lower end portion, said upper end portions being secured to said upper bracket via said upper securing means, and each of said lower end portions being secured to said lower bracket via said lower securing means;
    whereby said first, second and third pluralities of apertures in each of said upper and lower brackets enable said apparatus to be adjustably mounted to a rocker block and a stationary base of a rocking chair, to thereby enable said rocking chair to be securely positioned in one of first, second or third positions relative to said stationary base.

2. The apparatus of claim 1, wherein said upper and lower brackets each include shoulder portions at their forward and rearward portions which cooperate with said plurality of independent rocker springs to partially define channels in which independent installation shims may be slidably inserted therein to pre-tension said plurality of independent rocker springs prior to installation of said apparatus to said rocker block and said stationary base of said rocking chair.

3. The apparatus of claim 1, wherein said upper bracket further comprises a shoulder portion having a plurality of independent openings therein, each of said openings being in alignment with one of said springs and operable to maintain said one of said springs stationary and in abutting contact with said upper bracket; and
    wherein said lower bracket further comprises a shoulder portion having a plurality of independent openings therein, each of said independent openings of said lower bracket being in alignment with said one of said springs and operable to hold said lower end portion of said one of said springs stationary and in abutting contact with said lower bracket.

4. The apparatus of claim 1, wherein each said one of said plurality of independent springs comprises a coil spring.

5. The apparatus of claim 1, wherein said upper securing means comprises a plurality of independent tabs operable to secure said upper end portions of each said one of said plurality of independent springs to said upper bracket; and
    wherein said lower securing means comprises a plurality of independent tabs operable to secure said lower end portions of each said one of said plurality of independent springs to said lower bracket.

6. An adjustable rocker spring apparatus, said apparatus comprising:

plurality of independent rocker springs;

an L-shaped, upper bracket having first and second bracket portions;

said first bracket portion of said L-shaped upper bracket having forward, central and rearward portions;

said forward portion including a first plurality of apertures;

said central portion including a second plurality of apertures;

said rearward portion including a third plurality of apertures, said first, second and third pluralities of apertures permitting said first bracket portion of said L-shaped upper bracket to be adjustably secured with a plurality of fasteners to a rocker block of a rocking chair;

said second bracket portion of said L-shaped upper bracket including upper tab means for securing said plurality of independent rocker springs thereto;

an L-shaped lower bracket having first and second bracket portions;

said first bracket portion of said L-shaped lower bracket having forward, central and rearward portions;

said forward portion of said L-shaped lower bracket including a first plurality of apertures;

said central portion of said L-shaped lower bracket including a second plurality of apertures;

said rearward portion of said L-shaped lower bracket including a third plurality of apertures;

said first, second and third pluralities of apertures of said L-shaped lower bracket permitting said first bracket portion of said L-shaped lower bracket to be adjustably secured with said plurality of fasteners to said stationary base of said rocking chair;

said second bracket portion of said L-shaped lower bracket including lower tab means for securing said plurality of independent rocker springs thereto;

said plurality of independent rocker springs being disposed inbetween said second bracket portion of said L-shaped upper bracket and said second bracket portion of said L-shaped lower bracket; and each one of said plurality of independent springs having upper and lower end portions, said upper end portions being secured via said upper tab means to said second bracket portion of said L-shaped upper bracket, and said lower end portions being secured to said second bracket portion of said L-shaped lower bracket via said lower tab means; and whereby each of said first, second and third pluralities of apertures in each of said L-shaped upper and lower brackets enable said apparatus to be adjustably mounted in first, second and third positions to said rocker block and said stationary base of said rocking chair.

7. The apparatus of claim 6, wherein said second bracket portion of said L-shaped upper bracket includes a shoulder portion having a plurality of independent openings therein, each one of said independent openings being operable to alignably secure said upper end portion of a respective one of said independent plurality of springs in abutting engagement with said second bracket portion of said L-shaped upper bracket; and wherein said second bracket portion of said L-shaped lower bracket includes a shoulder portion having a plurality of independent openings therein, each of said independent openings in said L-shaped upper bracket being operable to alignably secure said lower end portion of a respective one of said independent springs in abutting engagement with said second bracket portion of said L-shaped lower bracket.

8. The apparatus of claim 6, wherein said second bracket portion of said L-shaped upper bracket further includes a transversely extending forward shoulder portion and a transversely extending rearward shoulder portion, and said second bracket portion of said L-shaped lower bracket further includes a transversely extending forward shoulder portion and a transversely extending rearward shoulder portion;

said transversely extending forward shoulder portions of said L-shaped upper and lower brackets being operable to partially define with one of said plurality of independent springs a channel within which a first independent installation shim may be inserted; and said transversely extending rearward shoulder portions of said L-shaped upper and lower brackets being adapted to partially define with one of said plurality of independent springs a channel within which a second independent installation shim may be removably inserted, whereby said installation shims pre-tension said rocker springs and facilitate installation of said apparatus to said rocker block and said stationary base of said rocking chair.

9. The apparatus of claim 6, wherein said upper tab means comprises a plurality of independent tabs operable to fixedly secure a portion of said upper end portion of each one of said plurality of independent springs to said second bracket portion of said L-shaped upper bracket; and wherein said lower tab means comprises a plurality of independent tabs operable to fixedly secure a portion of said lower end portions of each of one of said plurality of independent springs to said second bracket portion of said L-shaped lower bracket.

10. The apparatus of claim 6, wherein each of said rocker springs comprises a coil spring.

11. An adjustable rocker spring apparatus comprising:

a plurality of independent rocker springs;

an upper bracket having at least forward and rearward portions;

said forward portion having a first plurality of apertures;

said rearward portion having a second plurality of apertures;

said upper bracket further including upper securing means for securing thereto said plurality of independent rocker springs;

a lower bracket having at least forward and rearward portions;

said forward portion of said lower bracket having a first plurality of apertures;

said rearward portion of said lower bracket having a second plurality of apertures;

said lower bracket further including lower securing means for securing thereto said plurality of independent rocker springs; and said plurality of independent rocker springs being disposed inbetween said upper and lower brackets, each one of said independent rocker springs having an upper end portion and a lower end portion, said upper end portions being secured to said upper bracket via said upper securing means, and each of said lower end portions being secured to said lower bracket via said lower securing means;

whereby said first and second pluralities of apertures of each of said upper and lower brackets enable said apparatus to be adjustably mounted respectively relative to a rocker block and a stationary base of a rocking chair in first and second positions, thereby adjustably balancing said rocking chair relative to said stationary base.

* * * * *